United States Patent
Johnson et al.

(10) Patent No.: US 7,666,928 B2
(45) Date of Patent: Feb. 23, 2010

(54) STAGED ADDITION OF NON-FLUORINATED ANIONIC SURFACTANT TO REDUCED FLUOROSURFACTANT FLUOROPOLYMER DISPERSION

(75) Inventors: David William Johnson, Washington, WV (US); Robert John Cavanaugh, Cincinnati, OH (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 248 days.

(21) Appl. No.: 11/805,372

(22) Filed: May 22, 2007

(65) Prior Publication Data

US 2007/0282054 A1    Dec. 6, 2007

Related U.S. Application Data

(60) Provisional application No. 60/809,643, filed on May 31, 2006.

(51) Int. Cl.
  *C08L 1/00* (2006.01)
(52) U.S. Cl. .............. 523/310; 210/662; 524/544; 524/700; 524/800; 524/805; 554/191
(58) Field of Classification Search ............ 523/310; 210/662; 524/544, 700, 800, 805; 544/191
  See application file for complete search history.

(56) References Cited

U.S. PATENT DOCUMENTS

| | | | |
|---|---|---|---|
| 2,478,229 A | 8/1949 | Berry | |
| 2,559,752 A | 7/1951 | Berry | |
| 2,863,889 A | 12/1958 | Marks | |
| 3,037,953 A | 6/1962 | Marks et al. | |
| 3,704,272 A | 11/1972 | Holmes | |
| 3,882,153 A | 5/1975 | Seki et al. | |
| 4,282,162 A | 8/1981 | Kuhls | |
| 4,369,266 A | 1/1983 | Kuhls et al. | |
| 4,380,618 A | 4/1983 | Khan et al. | |
| 5,055,286 A | 10/1991 | Watanabe et al. | |
| 6,153,688 A | 11/2000 | Miura et al. | |
| 6,365,684 B1 | 4/2002 | McCarthy et al. | |
| 6,436,244 B1 | 8/2002 | Fuhrer et al. | |
| 6,518,442 B1 | 2/2003 | Felix et al. | |
| 6,642,415 B1 | 11/2003 | Fuhrer et al. | |
| 6,720,437 B2 * | 4/2004 | Jones et al. | ............ 554/191 |
| 6,825,250 B2 | 11/2004 | Epsch et al. | |
| 6,833,403 B1 | 12/2004 | Bladel et al. | |
| 6,861,466 B2 * | 3/2005 | Dadalas et al. | ............ 524/544 |
| 7,041,728 B2 * | 5/2006 | Zipplies et al. | ............ 524/544 |
| 7,279,522 B2 * | 10/2007 | Dadalas et al. | ............ 524/544 |
| 2002/0151748 A1 | 10/2002 | Jones et al. | |
| 2003/0054122 A1 | 3/2003 | Forbes et al. | |
| 2003/0125421 A1 | 7/2003 | Bladel et al. | |
| 2003/0220442 A1 | 11/2003 | Epsch et al. | |
| 2004/0132927 A1 | 7/2004 | Blong et al. | |
| 2004/0143052 A1 | 7/2004 | Epsch et al. | |
| 2004/0171736 A1 | 9/2004 | Dadalas et al. | |
| 2004/0186219 A1 | 9/2004 | Dadalas et al. | |
| 2005/0090601 A1 * | 4/2005 | Dadalas et al. | ............ 524/544 |
| 2006/0036021 A1 | 2/2006 | Noelke et al. | |

FOREIGN PATENT DOCUMENTS

| | | |
|---|---|---|
| EP | 0818506 B1 | 5/2000 |
| EP | 1195420 A1 | 4/2002 |
| EP | 1155055 B1 | 4/2003 |
| EP | 1335007 A1 | 8/2003 |
| EP | 1364972 A1 | 11/2003 |
| EP | 1382593 A2 | 1/2004 |
| EP | 1561742 A1 | 8/2005 |
| WO | WO00/35971 | 6/2000 |
| WO | WO03/051988 A2 | 6/2003 |
| WO | WO03/059992 A1 | 7/2003 |
| WO | WO2006/020721 A1 | 2/2006 |

OTHER PUBLICATIONS

Internet Article "Continuous Ion Exchange", Rensselaer PolyTechnic Institute, Department of Chemical and Biological Engineering, Troy, NY http://www.rpi.edu/dept/chem-eng/Biotech-Environ/IONEX/continuo.htm, Apr. 18, 1995.

* cited by examiner

*Primary Examiner*—Peter D. Mulcahy
*Assistant Examiner*—Henry Hu

(57) ABSTRACT

A process for reducing fluorosurfactant content of a fluorosurfactant-containing aqueous fluoropolymer dispersion stabilized with nonionic surfactant. The process includes reducing the fluorosurfactant content of the stabilized fluorosurfactant-containing aqueous fluoropolymer dispersion to a predetermined level to provide a reduced surfactant dispersion, adding non-fluorinated anionic surfactant to the reduced fluorosurfactant dispersion, and concentrating the reduced fluorosurfactant dispersion. The non-fluorinated anionic surfactant is added in stages wherein a first portion is added to the dispersion prior to concentrating and a second portion of the non-fluorinated anionic surfactant is added to the dispersion after concentrating.

16 Claims, No Drawings

US 7,666,928 B2

STAGED ADDITION OF NON-FLUORINATED ANIONIC SURFACTANT TO REDUCED FLUOROSURFACTANT FLUOROPOLYMER DISPERSION

FIELD OF INVENTION

The present invent relates to a process for reducing the fluorosurfactant content of and concentrating aqueous fluoropolymer dispersions stabilized with nonionic surfactant and more particularly relates to such a process in which non-fluorinated anionic surfactant is added in stages before and after concentration.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore, other processes have been developed for applying coatings of PTFE homopolymers and modified PTFE. One such process is dispersion coating which applies the fluoropolymer in dispersion form. Dispersions used in coating processes are usually in a concentrated form and contain a significant quantity of nonionic surfactant, e.g. 6-8 weight percent, as taught in Marks et al., U.S. Pat. No. 3,037,953, and in Holmes, U.S. Pat. No. 3,704,272 to raise the solids from nominally 35 wt % in the raw dispersion to about 60 wt % in the concentrated dispersion. Miura et al., U.S. Pat. No. 6,153,688 discloses a similar process. Similar dispersions and coating processes are also used for making coatings of melt-processible fluoropolymers.

Fluorosurfactants are typically used as an ingredient in the dispersion polymerization of fluoropolymers since a non-telogenic dispersing agent is generally required in commercial fluoropolymer dispersion polymerization processes. For example, an early description of fluorosurfactants used commercially is found in U.S. Pat. No. 2,559,752 to Berry. These fluorosurfactants are anionic surfactants, usually perfluorinated carboxylic acids, e.g., ammonium perfluorocaprylate or ammonium perfluorooctanoate.

Because of environmental concerns and because fluorosurfactants are expensive, processes have been developed for the removal and recovery of fluorosurfactants from aqueous fluoropolymer dispersions. One method for removal of fluorosurfactants from fluoropolymer dispersions is disclosed in U.S. Pat. No. 4,369,266 and includes the addition of a stabilizing surfactant followed by concentration by ultrafiltration. This patent teaches that a high proportion of the fluorosurfactant can be removed via the aqueous permeate. It is also known to remove anionic fluorosurfactant by adsorption onto an ion exchange resin as taught in U.S. Pat. No. 3,882,153 (Seki et al) and U.S. Pat. No. 4,282,162 (Kuhls). Kuhls teaches recovery of fluorosurfactants dissolved in the aqueous phase after coagulation of the polymer from the dispersion or in aqueous polymer dispersions to be concentrated. U.S. Pat. No. 6,833,403 (Bladel et al.) is a more recent patent teaching the same process. In these anion exchange processes, the fluorosurfactant is removed by the anion exchange resin from a stabilized dispersion containing nonionic surfactant.

In concentrated aqueous fluoropolymer dispersions which have reduced levels of fluorosurfactant, the viscosity levels can be higher than in dispersions containing fluorosurfactant and can be unacceptably high for some end uses. Certain types of fluoropolymer dispersion, particularly high molecular weight polytetrafluoroethylene dispersions, show an increase to an unusually high viscosity when the fluorosurfactant content is significantly reduced. Viscosity can rise to a level of several hundred centipoise (cP), well above the normal 20-30 cP which is advantageous for coating and impregnating compositions and to make cast films. US 2004/0186219 A1 and U.S. Pat. No. 6,861,466 B2 (Dadelas et al.) disclose the addition of non-fluorinated anionic surfactant, e.g., sodium lauryl sulfate, sodium dodecylbenzyl sulphonate and secondary alkyl sulphonate sodium salt, to reduce viscosity. These references teach the addition of non-fluorinated anionic surfactant prior to or after concentration.

However, employing non-fluorinated anionic surfactant according to the processes of US 2004/0186219 A1 and U.S. Pat. No. 6,861,466 B2 (Dadelas et al.) can cause problems when concentration is carried out using a thermal concentration method as taught as taught in Marks et al., U.S. Pat. No. 3,037,953, and the other patents referred to above. In thermal concentration, the lower solubility of the nonionic surfactant at elevated temperatures, i.e., the nonionic surfactant having "cloud point", is used to create a phase separation with a lower phase having high fluoropolymer solids and an upper phase having very low solids. These phase are separated usually by decanting off the upper phase and recovering the lower high fluoropolymer solids phase as concentrated dispersion.

When non-fluorinated anionic surfactant is present during concentration, a significant portion of it will be lost due to it being in the low solids upper phase after concentration. If sufficient anionic surfactant is added prior to concentration to compensate for such loss and to control viscosity in the finished concentrated dispersion, the anionic surfactant has been found to narrow the "concentration window". The "concentration window" refers collectively to the range in the level of nonionic surfactant and the temperature range within which concentration will proceed efficiently. For concentration with a narrow concentration window caused by too much anionic surfactant, tight control of and/or more extreme levels of nonionic surfactant, temperatures or both will be required. Moreover, the amount of non-fluorinated anionic surfactant will vary greatly with the exact solids content of the finished dispersion, i.e., slightly higher that the targeted solids content will reduce anionic surfactant levels. This will cause the non-fluorinated anionic surfactant level to vary from batch to batch and the level in some dispersions may be insufficient to control viscosity.

If, on the other hand, the addition of the anionic surfactant is delayed until after concentration, the concentrated dispersion without anionic surfactant will go through an extremely high viscosity maximum which may interfere with handling of the dispersion for decanting of the upper phase and in subsequent handling prior to anionic surfactant addition.

In addition, a phenomena known as "skinning" can occur in fluoropolymer dispersions. When a dispersion is allowed to stand in an open, stagnant bath, a skin can sometimes form on the surface of the dispersion due to drying. This skin is detrimental in that it can sometimes be picked up by the article being coated and result in a coating defect. While skinning can occur in several types of dispersions, it is more pronounced in dispersions having a high viscosity and/or a low level of the fluorocarbon surfactant used in polymerization.

BRIEF SUMMARY OF THE INVENTION

The present invention provides a process for reducing fluorosurfactant content of a fluorosurfactant-containing aqueous fluoropolymer dispersion stabilized with nonionic surfactant. The process includes reducing the fluorosurfactant content of the stabilized fluorosurfactant-containing aqueous fluoropolymer dispersion to a predetermined level to provide a reduced surfactant dispersion, adding non-fluorinated anionic surfactant to the reduced fluorosurfactant dispersion, and concentrating the reduced fluorosurfactant dispersion. Concentration is performed by heating the dispersion to a temperature within an operable temperature range for the nonionic surfactant at an operable surfactant level range which causes the dispersion to separate into upper and lower phases. The lower phase is recovered as concentrated dispersion. The non-fluorinated anionic surfactant is added in stages wherein a first portion is added to the dispersion prior to concentrating in an amount sufficient to increase the operable temperature range, the operable surfactant level range or both during concentration. At least a second portion of the non-fluorinated anionic surfactant is added to the dispersion after the concentrating in an amount sufficient to control viscosity of the concentrated dispersion to a predetermined value.

In one preferred embodiment, the first portion is added in an amount of about 20 to about 500 ppm based on weight of the dispersion, preferably about 30 to about 400 ppm. In another preferred embodiment the second portion is added in an amount sufficient to decrease viscosity to less than 30 cps at room temperature. Preferably, non-fluorinated anionic surfactant is also added in an amount sufficient to prevent skinning. In another preferred embodiment, the second portion is added in an amount, which combined with the first portion provides a total non-fluorinated anionic surfactant of about 30 to about 400 ppm based on weight of the dispersion.

DETAILED DESCRIPTION OF THE INVENTION

Fluoropolymers

The aqueous fluoropolymer dispersion used in accordance with the present invention is made by dispersion polymerization (also known as emulsion polymerization). Fluoropolymer dispersions are comprised of particles of polymers made from monomers wherein at least one of the monomers contains fluorine. The fluoropolymer of the particles of the aqueous dispersions of this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

Preferred fluoropolymer particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE preferably contains a comonomer modifier which improves film forming capability during baking (fusing), such as perfluoroolefin, notably hexafluoropropylene (HFP) or perfluoro(alkyl vinyl)ether (PAVE), where the alkyl group contains 1 to 5 carbon atoms, with perfluoro (ethyl vinyl) ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. In this preferred form of the invention, the PTFE typically has a melt creep viscosity of at least $1 \times 10^9$ Pa·s. The resins in the dispersion used in this form of the invention when isolated and dried are thus non-melt-processible.

By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In one preferred embodiment, the fluoropolymer particles in the dispersion used in this invention comprise a core of high molecular weight polytetrafluoroethylene (PTFE) and a shell of lower molecular weight polytetrafluoroethylene or modified polytetrafluoroethylene.

The preferred non-melt-processible PTFE or modified PTFE have a standard specific gravity (SSG) of about 2.13 to about 2.50. Preferably, the SSG is less than about 2.40, more preferably less than about 2.30, and most preferably less than about 2.25. The SSG is generally inversely proportional to the molecular weight of PTFE or modified PTFE.

The fluoropolymer particles in the dispersion used in this invention preferably have a number average particle size of about 10 nm to about 400 nm, most preferably, about 100 nm to about 400 nm.

A typical process for the aqueous dispersion polymerization of preferred PTFE polymer is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with nonionic surfactant.

The fluorosurfactant used in the manufacture of the dispersion is a non-telogenic, fluorinated anionic surfactant, soluble in water and comprising an anionic hydrophilic group and a hydrophobic portion. Preferably, the hydrophobic portion is an aliphatic fluoroalkyl group containing at least four carbon atoms and bearing fluorine atoms and having no more than two carbon atoms not bearing fluorine atoms adjacent to the hydrophilic group. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic or sulfonic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed. The fluorinated surfactant is used to aid the polymerization process but the amount remaining in the dispersion is significantly reduced as will be explained below.

The initiators preferably used to make dispersion of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators, small amounts of short chain dicarboxylic acids such as succinic acid or initiators that produce succinic acid such as disuccinic acid peroxide (DSP) may be also be added in order to reduce coagulum To produce dispersion with low fluorosurfactant content as described below, sufficient nonionic surfactant as is described in more detail hereinafter is added to prevent coagulation of the dispersion when the fluorosurfactant content is reduced. The aqueous dispersion can range in fluoropolymer solids content from about 15 to about 65 wt %, preferably about 25 to about 55 wt %, more preferably 35 to about 50 wt %. Typically, nonionic surfactant is added for stabilization prior to fluorosurfactant reduction and then as desired, concentration of the dispersion is conducted. For concentrating, the polymer is held at a temperature above the cloud point of the nonionic surfactant. Once concentrated to about 25 to about 70 weight % fluoropolymer, and preferably about 45 to about 65 weight % fluoropolymer, the upper clear supernate is removed. Further adjustment of the final solids concentration and surfactant are made as needed. One patent illustrative of a process for concentrating is U.S. Pat. No. 3,037,953 to Marks and Whipple.

Nonionic Surfactants

Any of a variety of nonionic surfactants can be used for stabilizing aqueous fluoropolymer dispersions in the process for reducing fluorosurfactant content of the dispersions in accordance with the invention. Such nonionic surfactants include alkyl phenol ethoxylates and aliphatic alcohol ethoxylates. Preferably, the nonionic surfactants used are aliphatic alcohol ethoxylates. The nonionic surfactants are preferably present in the dispersion in amounts of about 2 to about 11 weight %, most preferably about 3 to about 11 weight %, based on the weight of the fluoropolymer. Further the non-ionic surfactant is preferably present in the amount of about 1 to about 5% based on the weight of the dispersion. Suitable nonionic surfactants include any of a variety of nonionic surfactants or mixtures thereof which preferably provide a desired cloud point during concentration.

The dispersions used in this invention are preferably essentially free of surfactants containing aromatic groups that can thermally decompose and be converted to harmful organic aromatic compounds that may adversely affect air and water quality during dispersion coating processes. In addition, these materials are prone to producing tar-like buildup on processing equipment and producing smoke. Essentially free of essentially free of surfactants containing aromatic groups preferably means that the dispersions employed contain less than about 0.5 weight % of such surfactants. The surfactants used in this invention burn off cleanly without thermally decomposing on a substrate leaving lower residuals than alkyl phenol ethoxylates.

Especially preferred aliphatic alcohol ethoxylates are a compound or mixture of compounds of the formula:

R(OCH$_2$CH$_2$)$_n$OH wherein R is a branched alkyl, branched alkenyl, cycloalkyl, or cycloalkenyl hydrocarbon group having 8-18 carbon atoms and n is an average value of 5 to 18. For example, a preferred ethoxylate used in this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate used in accordance with this invention does not contain an aromatic group. The number of ethylene oxide units in the hydrophilic portion of the molecule may comprise either a broad or narrow monomodal distribution as typically supplied or a broader or bimodal distribution which may be obtained by blending.

Nonionic surfactants employed in dispersions employed in accordance with the invention are preferably ethoxylates of saturated or unsaturated secondary alcohols having 8-18 carbon atoms. Secondary alcohol ethoxylates possess advantages over both primary alcohol ethoxylates and phenol ethoxylates including lower aqueous viscosities, more narrow gel ranges, and less foaming. Moreover, ethoxylates of secondary alcohols provide improved surface tension lowering and thus excellent wetting in end use applications such as coating operations.

The cloud point of a surfactant is a measure of the solubility of the surfactant in water. The surfactants in the aqueous dispersion employed in accordance with the invention preferably have a cloud point of about 30° C. to about 90° C., preferably about 35° C. to about 85° C.

The aliphatic alcohol ethoxylates employed in carrying out the present invention also have a 20% residuals temperature determined by TGA of less than about 290° C., preferably less than 285° C. more preferably less than 280° C. and typically fall within the preferred range of 250° C. to 290° C. In addition or in the alternative, it is preferred that the aliphatic alcohol ethoxylate nonionic surfactant has a thermal decomposition temperature determined by thermogravimetric analysis (TGA) of less than about 250° C., more preferably less than about 240° C., most preferably less than about 230° C.

Nonionic surfactants of the type generally used to stabilize fluoropolymer dispersions can be either liquids or solids at room temperature. If solid, the surfactant tends to be pasty and difficult to handle. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

Generally low viscosity liquids are preferred from a handling point of view. High viscosity liquids are more difficult to handle and often require heated tanks and lines to keep the viscosity low enough for ease in handling. Some of the apparent liquid surfactants are physically meta-stable in that they may exist as liquids for several days and then turn into pasty solids. Sometimes water is added to the surfactant to lower its viscosity and making it easier to handle. However, too much water detracts from the desire to produce more concentrated dispersions.

The aqueous dispersion of non-melt-processible fluoropolymer particles and nonionic surfactant preferably used in this invention preferably contains a nonionic surfactant containing 0-20 weight % water, preferably 0-15 weight % water and is a stable liquid at room temperature. A surfactant is considered to be a stable liquid if it remains liquid for 3 days at room temperature after being chilled to 5° C. and then warmed to room temperature (about 23±3° C.).

In a more preferred form of the dispersion employed in accordance with the invention, the aliphatic alcohol ethoxylate nonionic surfactant comprises ethoxylates of 2,6,8-trimethyl-4-nananol having an average of about 4 to about 12 ethylene oxide (EO) units, most preferably, ethoxylates of 2,6,8-trimethyl-4-nananol having an average about 9 to about 11 ethylene oxide units. Examples of preferred surfactants of this type are those sold under the trademark Tergitol® TMN-6 (nominally 6 EO units) and Tergitol® TMN-10 (nominally 10 EO units) which are available from Dow Chemical Corporation. A blend of 30% Tergitol® TMN-6 and 70% Tergitol® is also available from Dow Chemical Corporation as Tergitol® TMN-100X.

Fluorosurfactant Reduction

The process of this invention includes reducing the fluorosurfactant content of the stabilized fluorosurfactant-containing aqueous fluoropolymer dispersion to a predetermined level. In preferred embodiments, the predetermined level is less than about 300 ppm based on the total dispersion weight, more preferably less than about 100 ppm, even more preferably less than about 50 ppm, even more preferably less that about 20 ppm, and most preferably less that about 10 ppm, based on the weight of the dispersion.

The fluorosurfactant content can be reduced by any of a variety of procedures known in the art. In the preferred embodiment of the present invention, the fluorosurfactant is removed by adsorption onto an ion exchange resin as taught has been taught in U.S. Pat. No. 3,882,153 (Seki et al.), U.S. Pat. No. 4,282,162 (Kuhls), and U.S. Pat. No. 6,833,403 (Bladel et al.).

When anion exchange methods are used, fluorosurfactant reduction is preferably performed prior to concentration. If the non-fluorinated anionic surfactant is added prior to ion exchange in accordance with the invention, it would be removed during anion exchange. In addition, contacting of the dispersion with anion exchange resin prior to concentration is desirable because lower solids material is easier to process, especially when a fixed bed is employed for carrying out the contacting step.

Any of a variety of techniques which bring the dispersion in contact with the anion exchange resin can be used to carry out ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate or a viscosity increase in observed. Upper treatment temperature will vary with the type of polymer and nonionic surfactant employed. Typically, temperatures will be between 20° C. and 80° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

Ion Exchange Resins

The ion exchange resins for use in accordance with reducing the fluorosurfactant content of the aqueous dispersion of the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used to reduce fluorosurfactant for use in the process of the present invention is preferably monodisperse. Preferably, the ion exchange resin beads have a number average size distribution in which 95% of the beads have a diameter within plus or minus 100 µm of the number average bead diameter.

The monodisperse ion exchange resin has a particle size which provides a suitable pressure drop through the bed. As discussed previously, very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Concentration

Concentration is preferably carried out as disclosed in Marks et al., U.S. Pat. No. 3,037,953, Holmes, U.S. Pat. No. 3,704,272 Miura et al., U.S. Pat. No. 6,153,688 which disclose thermal concentration processes. In thermal concentration, the dispersion is heated to a temperature at which the solubility of the nonionic surfactant is lower under the conditions employed, i.e., to the "cloud point". This temperature is primarily dependent upon the type of nonionic surfactant employed but also varies to a lesser extent with factors including the amount of nonionic surfactant, the presence of other materials in the dispersion and solids content. Heating to the cloud point, is used to create a phase separation with a lower high solids concentrated phase and a very low solids upper phase. These phase are separated usually by decanting off the upper phase.

For successful thermal concentrations, it is necessary to control the temperature and for the selected amount of non-ionic surfactant employed since other factors which affect cloud point typically cannot be changed. The operable temperature range and nonionic surfactant level range for a given dispersion are often referred to collectively as the "concentration window". In general, the broader the concentration window for the dispersion, i.e., the broader the operable temperature range and operable surfactant level range, the more successful and efficient a commercial concentration process will be. As discussed below and as illustrated more fully in the Examples, a portion of the non-fluorinated anionic surfactant is added prior to concentration in accordance with the invention so that the operating concentration window is broadened. At least a second portion of the non-fluorinated anionic surfactant is added to said dispersion after concentrating in an amount sufficient to control viscosity to a predetermined value. Preferably, the second portion of the non-fluorinated anionic surfactant is added in an amount sufficient to eliminate skinning.

Non-Fluorinated Anionic Surfactants

In the practice of the invention, any of variety of non-fluorinated anionic surfactants can be used including but not limited to sodium lauryl sulfate, sodium dodecylbenzyl sulphonate and secondary alkyl sulphonate sodium salts. Additional anionic surfactants such as those disclosed in U.S. Pat. No. 6,861,466 (Dadelas et al.) can be used. An especially referred non-fluorinated anionic surfactant is ammonium or alkali metal lauryl sulfate, most preferably sodium lauryl sulfate.

Staged Addition of Non-Fluorinated Anionic Surfactants

In accordance with the invention, a first portion of the non-fluorinated anionic surfactant is added to the dispersion prior to concentrating. The amount added prior to concentration is in an amount sufficient to increase the operable temperature range, surfactant level range or both during concentration. In a preferred embodiment, the first portion is added in an amount of about 20 to about 500 ppm based on weight of the dispersion, preferably about 30 to about 400 ppm. As will be shown in the examples, the range of operating temperatures for thermal concentration of an aqueous fluoropolymer dispersion with a given nonionic surfactant can be increased by least about 3° C., preferably at least about 7° C. by employing non-fluorinated anionic surfactant at a selected level provided the first addition. In addition, or alternatively, range of the level of a given nonionic surfactant can also be increased at a given temperature by as much as about 25% by employing non-fluorinated anionic surfactant at a selected level provided the first addition.

According to the present invention, at least a second portion of the non-fluorinated anionic surfactant is added to the dispersion after concentrating in an amount sufficient to control viscosity. Although viscosity control can be achieved by addition of the non-fluorinated anionic surfactant prior to concentration, the addition of higher than optimum levels of non-fluorinated anionic surfactant will narrow the concentration window. Unexpectedly, the staged addition of non-fluorinated anionic surfactant within specified amounts, i.e., a first portion prior to concentration and at least a second portion after concentration, can provide both an optimum concentration window and allow for viscosity control in the concentrated reduced fluorosurfactant. In a preferred embodiment the second portion is added in an amount, which combined with the first portion provides a total non-fluorinated anionic surfactant content of about 30 to about 500 ppm based on weight of the dispersion, recognizing that some non-fluorinated anionic surfactant added prior to concentration is lost in the concentration process.

In one preferred embodiment, the second portion of non-fluorinated anionic surfactant is added in amount sufficient to decrease viscosity to less than 30 cps at room temperature. Preferably, nonionic surfactant is added in an amount sufficient to control or eliminate skinning as indicated by improved skinning behavior in the Needle Skinning Test (NST) described in the Test Methods. In another embodiment of the invention, the second portion of non-fluorinated anionic surfactant is added in amount to provide a Needle Skinning Test value (NST) of no greater than 1. Generally, the amount of non-fluorinated surfactant required to eliminate skinning is greater than that required to reduce viscosity to a level less than about 30 cps. Skinning is an undesirable attribute of dispersions with high viscosity wherein a skin forms on the surface of dispersion after brief exposure to the atmosphere. Skinning can cause problems in coating applications and may produce defects in coated surfaces.

A balance of anionic surfactant addition in accordance with the invention both before and after concentration can achieve a broadened concentration window, i.e., increase in the operable temperature range and/or nonionic surfactant level range, as well as viscosity control in the finished dispersions. Preferably, the total amount of non-fluorinated anionic surfactant employed in the finished concentrated dispersion is selected to be as low as possible to control viscosity. In generally, it is undesirable in most applications to add more anionic surfactant than necessary to fluoropolymer dispersions due to the increase in the ionic strength, shortened shell life, and the increase in viscosity which results with high levels of anionic surfactant.

Test Methods

Solids content of raw (as polymerized) fluoropolymer dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.)

Number average dispersion particle size on raw dispersion is measured by photon correlation spectroscopy.

Standard specific gravity (SSG) of PTFE resin is measured by the method of ASTM D-4895. If a surfactant is present, it can be removed by the extraction procedure in ASTM-D-4441 prior to determining SSG by ASTM D-4895.

Surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is stated in wt % based on fluoropolymer solids, the weight of the dispersion or the weight of the aqueous phase as indicated.

Fluorosurfactant content is measured by a GC technique in which the fluorosurfactant is esterified with acidic methanol. Perfluoroheptanoic acid is used as an internal standard. Upon addition of electrolyte and hexane the ester is extracted into the upper hexane layer. The hexane layer is analyzed by injection onto a glass GC column of 20 ft.×2 mm I.D. packed with 10% OV-210 on 70/80 mech Chromosorb W.AW.D-MCS. held at 120 C. The detector is ECD and the carrier gas of 95% argon/5% methane has a flow rate of 20 to 30 ml/min.

Dispersion Viscosity is determined at room temperature using a Brookfield Viscometer Model LVF using an appropriate spindle to obtain a mid-dial instrument reading.

Needle Skinning Test (NST) A sample of 20 ml of dispersion is filtered through a 5 micron syringe filter and is placed in an aluminum pan 50 mm in diameter. The pans are placed away from air drafts and are examined with a needle once an hour for 4 hours. The surface of the dispersion is probed with the needle and a point score is assigned based on the reaction of the dispersion.

| | |
|---|---|
| 0 Points | No evidence of any skin formation in the dispersion. |
| 1 Point | A very faint track is seen where the needle has been pulled through the dispersion. |
| 2 Points | A definite track is seen on the surface. The track remains visible for several minutes. |
| 3 Points | Skin adjacent to the needle track is pulled by the needle. |
| 4 Points | The skin is strong enough that it can be lifted from the liquid beneath the skin. |

The results of the four hour reading are reported as the skinning level.

EXAMPLES

TFE is polymerized using ammonium persulfate as the initiator to produce a raw PTFE homopolymer dispersion containing PTFE particles having an SSG of a about 2.20 and a number average particle size of approximately of 215 nm to 245 nm. The raw dispersion contains approximately 45% fluoropolymer solids and has an APFO content of about 1800 ppm.

Fluorosurfactant reduction is performed using a 14 inch (36 cm) diameter column approximately 8 feet (2.5 meters) long containing a fixed bed column of commercially-available strong base anion exchange resin with quaternary ammonium groups with a dimethyl ethanol amine moiety in hydroxide form (A244-OH by US Filter). Approximately 240 gallon quantities of raw dispersions are stabilized by adding nonionic surfactant Tergitol® TMN-10 to provide approximately 4 wt % nonionic surfactant based on the weight of the dispersion. The PTFE dispersion is pumped through the column. The APFO level of dispersion is reduced to less than 20 ppm. Ammonium hydroxide is added adjust the pH to between about 9.5 and about 10.5.

The dispersion is then thermally concentrated using Tergitol® TMN-10 obtaining a solids content of between 59 and 61% by weight.

Example 1

Part A

This example shows that addition of an anionic surfactant such as sodium lauryl sulfate (SLS) prior to thermal concentration can broaden the window for concentration.

Samples of the dispersion described above are employed (after anion exchange to remove the APFO and prior to concentration). Samples were made up with 6.0, 7.0, 8.0 and 9.0% Tergitol TMN-10 based on the water phase. SLS solutions are added as indicated. The amount of SLS used is expressed in ppm based on total dispersion weight.

50 ml of each sample is placed in 100 ml graduated cylinders. The cylinders are placed in heated water baths that were controlled to ±0.1° C. When the samples reach the desired temperature, they are stirred and then are allowed to concentrate for 30 minutes. After 30 minutes, the volume of the lower concentrated phase is recorded. Based on the initial % PTFE solids and the desired % PTFE solids after concentration, it is calculated that the volume of the concentrated phase had to be 28 ml or less for concentration to be judged complete. The volumes of the concentrated phase after 30 minutes at the indicated temperatures are shown in the Table below. Samples that are completely concentrated, i.e., 28 ml or less are shown in underlined and bold type.

TABLE 1

| | | | Volume of the Concentrated Phase | | | | | | | | |
|---|---|---|---|---|---|---|---|---|---|---|---|
| SLS, ppm | % TMN-10 | Temp. ° C. | 68.5 | 70.1 | 72.2 | 73.6 | 74.6 | 76.9 | 78.3 | 79.1 | 80.1 |
| 0 | 6.0 | | 43 | 31 | 33 | 27 | 38 | 40 | 41 | 42 | 42 |
| 0 | 7.0 | | 43 | 30 | 30 | 27 | 37 | 39 | 41 | 42 | 42 |
| 0 | 8.0 | | 44 | 26 | 26 | 25 | 35 | 38 | 39 | 41 | 40 |
| 0 | 9.0 | | 45 | 27 | 27 | 25 | 33 | 36 | 38 | 39 | 39 |

TABLE 1-continued

| | | | Volume of the Concentrated Phase | | | | | | | |
|---|---|---|---|---|---|---|---|---|---|---|
| SLS, ppm | % TMN-10 | Temp. °C. | 68.5 | 70.1 | 72.2 | 73.6 | 74.6 | 76.9 | 78.3 | 79.1 | 80.1 |
| 90 | 6.0 | | 37 | 32 | 32 | 29 | 30 | 38 | 38 | 40 | 41 |
| 90 | 7.0 | | 35 | 32 | 33 | 32 | 32 | 38 | 38 | 40 | 41 |
| 90 | 8.0 | | 40 | __28__ | 30 | 29 | 31 | 36 | 38 | 40 | 40 |
| 90 | 9.0 | | 43 | __25__ | __25__ | __23__ | 31 | 34 | 37 | 39 | 36 |
| 225 | 6.0 | | 32 | __27__ | __25__ | __24__ | __25__ | __25__ | __27__ | __25__ | __26__ |
| 225 | 7.0 | | 32 | __26__ | __25__ | __24__ | __23__ | __23__ | __24__ | 32 | 33 |
| 225 | 8.0 | | 32 | __25__ | __25__ | __24__ | __22__ | __24__ | __28__ | 35 | 35 |
| 225 | 9.0 | | __27__ | __25__ | __24__ | __24__ | __22__ | __25__ | __28__ | 33 | 36 |
| 450 | 6.0 | | | 50 | 50 | 32 | | 38 | 29 | __27__ | __25__ |
| 450 | 7.0 | | | 43 | __28__ | 29 | | 35 | 29 | __27__ | __27__ |
| 450 | 8.0 | | | 36 | 30 | 33 | | 40 | 30 | 30 | 29 |
| 450 | 9.0 | | | 35 | 30 | 37 | | 48 | 38 | 33 | 32 |

As can be seen in Table 1, the level of SLS in the dispersion provided by the first portion added can provide for a wide concentration window that will give complete and rapid concentration under a range of nonionic surfactant and temperature conditions. For this dispersion, the optimum SLS level is in a range around 225 ppm. Insufficient SLS and too much SLS provide a narrow concentration window Part B The concentrated dispersion in Table 1 above having 7.5% Tergitol TMN-10 and 225 ppm SLS added prior to concentration (broadest temperature range), has a viscosity of 62 cps and rates 2 points in the Needle Skinning Test (NST). Addition of 200 ppm SLS after concentration reduces the viscosity to 24 cps and 0 points in the NST.

Example 2

This Example shows the effect of Sodium Lauryl Sulfate (SLS) on the viscosity and skinning behavior. It also shows that the composition (% solids and nonionic surfactant) affects the viscosity and SLS should be present after concentration for good viscosity and good results in the Needle Skinning Test (NST). This example thus shows that the non-fluorinated anionic surfactant should be added prior to and after concentration. Example 1 shows that there is an optimum level of anionic surfactant added prior to concentration which will result in a broader operability range for concentration. However, this level of anionic surfactant have been found to insufficient and variable with the a particular concentration process to control viscosity or skinning after concentration. Thus, additional hydrocarbon anionic surfactant is added after concentration.

In these examples the SLS is expressed as ppm SLS based on the total dispersion weight.

Samples of the dispersion described above are employed (after ion exchange to remove APFO and prior to concentration). Varying levels of a sodium lauryl sulfate are added to some samples prior to thermal concentration, after thermal concentrations in others, and both before and after concentration.

The samples are adjusted to contain 7.5% nonionic surfactant Tergitol TMN-10 based on the water phase and are thermally concentrated at 75° C. After concentration is completed, the supernate layer is drawn off and the % solids and nonionic surfactant levels are determined. The % solids and nonionic surfactant levels are then adjusted and an SLS solution is added to provide the SLS levels indicated.

TABLE 2

| Sample | % Solids | % TMN-10 | ppm SLS before conc. | ppm SLS after conc. | Viscosity | Skinning |
|---|---|---|---|---|---|---|
| 2-A | 60.0 | 6.0 | 0 | 0 | 200 | 3 |
| 2-B | 60.0 | 6.0 | 0 | 60 | 24 | 0 |
| 2-C | 61.0 | 7.0 | 0 | 0 | 445 | 4 |
| 2-D | 61.0 | 7.0 | 0 | 30 | 260 | 3 |
| 2-E | 61.0 | 7.0 | 0 | 90 | 138 | 3 |
| 2-F | 61.0 | 7.0 | 0 | 120 | 28 | 0 |
| 2-G | 61.0 | 7.0 | 0 | 150 | 26 | 0 |
| 2-H | 61.0 | 7.0 | 140 | 0 | 117 | 3 |
| 2-I | 61.0 | 7.0 | 233 | 0 | 62 | 2 |
| 2-J | 61.0 | 7.0 | 360 | 0 | 73 | 3 |
| 2-K | 61.0 | 7.0 | 450 | 0 | 17 | 0 |
| 2-L | 61.0 | 7.0 | 225 | 60 | 18 | 0 |

Samples 2-A and 2-B show that 200 ppm SLS added after concentration reduces the viscosity and skinning when the % solids are 60.0 and the nonionic surfactants 6.0%. When the % solids are increased to 61.0% and the nonionic surfactant to 7.0%, the skinning and viscosity problems return (Sample 2-C). Samples 2-D through 2-G show that by increasing the amount of non-fluorinated anionic surfactant added after concentration, the viscosity can be reduced and the skinning eliminated. In this case, it is necessary to add 120-150 ppm SLS after concentration to eliminate these problems.

This Example 2 illustrates that adding SLS prior to concentration is desirable because it avoids having the dispersion go through a viscosity maximum during concentration. However, in this case it is seen (Samples 2-H through 2-K) that a higher than desirable amount, 450 ppm SLS, is required to be added prior to concentration to provide a desirable viscosity of less than 30 cps after concentration. This is due to the loss of SLS during concentration since part of the SLS is in the water phase that is removed during concentration. As illustrated in Example 1 above, 450 ppm SLS will narrow the window for concentration making the optimum temperature for concentration above 80° C. This temperature is not desirable because the dispersion stability decreases at elevated temperatures.

Sample 2-L shows this dilemma can be avoided by employing the process of the invention in which a portion of the SLS is added prior to concentration to broaden the concentration window and then additional SLS added after concentration to control high viscosity and skinning also if desired.

What is claimed is:

1. A process for reducing fluorosurfactant content of a fluorosurfactant-containing aqueous fluoropolymer dispersion stabilized with nonionic surfactant comprising:
   reducing the fluorosurfactant content of said stabilized fluorosurfactant—containing aqueous fluoropolymer dispersion to provide a reduced surfactant dispersion;
   adding non-fluorinated anionic surfactant to said reduced fluorosurfactant dispersion; and
   concentrating said reduced fluorosurfactant dispersion by heating to a temperature within an operable temperature range for the nonionic surfactant at an operable surfactant level range which causes the dispersion to separate into upper and lower phases and recovering the lower phase as concentrated dispersion;
   a first portion of said non-fluorinated anionic surfactant being added to said dispersion prior to concentrating in an amount sufficient to increase said operable temperature range, said operable surfactant level range or both during concentration; and
   a second portion of said non-fluorinated anionic surfactant being added to said dispersion after said concentrating in an amount sufficient to control viscosity.

2. The process of claim 1 wherein said first portion of non-fluorinated anionic surfactant is added in an amount of about 20 to about 500 ppm based on weight of said dispersion.

3. The process of claim 1 wherein said first portion of non-fluorinated anionic surfactant is added in an amount of about 30 to about 400 ppm based on weight of said dispersion.

4. The process of claim 1 wherein the addition of said first portion of non-fluorinated anionic surfactant increases said operable temperature range by at least about 3° C.

5. The process of claim 1 wherein said second portion of non-fluorinated anionic surfactant is added in an amount sufficient to decrease viscosity to less than 30 cps at room temperature.

6. The process of claim 1 wherein said second portion of non-fluorinated anionic surfactant is added in an amount sufficient to provide a Needle Skinning Test value (NST) of no greater than 1.

7. The process of claim 1 wherein said second portion of non-fluorinated anionic surfactant is added in an amount which combined with said first portion provides a total non-fluorinated anionic surfactant content in said dispersion of about 30 to about 500 ppm based on weight of said dispersion.

8. The process of claim 1 wherein said stabilized fluorosurfactant-containing aqueous fluoropolymer dispersion has a solids content of about 15 to about 60 wt %.

9. The process of claim 1 wherein said stabilized fluorosurfactant-containing aqueous fluoropolymer dispersion has a solids content of about 25 to about 55 wt %.

10. The process of claim 1 wherein said stabilized fluorosurfactant-containing aqueous fluoropolymer dispersion has a solids content of about 35 to about 50 wt %.

11. The process of claim 1 wherein said concentrating produces a dispersion having a solids content of about 25 to about 70 wt %.

12. The process of claim 1 wherein said nonionic surfactant is present in said fluorosurfactant-containing dispersion an amount of about 1 to about 5% based the weight of the dispersion.

13. The process of claim 1 wherein said reducing the fluorosurfactant content of said stabilized fluorosurfactant-containing aqueous fluoropolymer dispersion comprises:
   contacting said stabilized fluorosurfactant-containing aqueous fluoropolymer dispersion with an anion exchange resin; and
   separating said anion exchange resin from said dispersion after the fluorosurfactant content has been reduced.

14. The process of claim 13 wherein said contacting said stabilized fluorosurfactant-containing aqueous fluoropolymer dispersion with anion exchange resin reduces fluorosurfactant content to less than about 300 ppm.

15. The process of claim 13 wherein said contacting said stabilized fluorosurfactant-containing aqueous fluoropolymer dispersion with anion exchange resin reduces fluorosurfactant content to less than about 100 ppm.

16. The process of claim 13 wherein said contacting said stabilized fluorosurfactant-containing aqueous fluoropolymer dispersion with anion exchange resin reduces fluorosurfactant content to less than about 50 ppm.

* * * * *